C. PERLEY.
Capstan.
No. 1,188.
Reissued May 21, 1861.
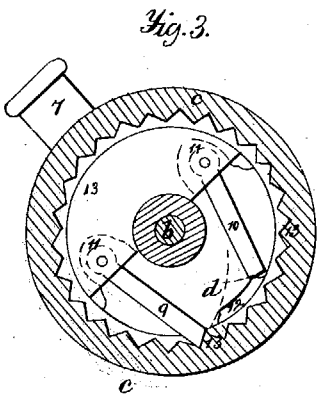
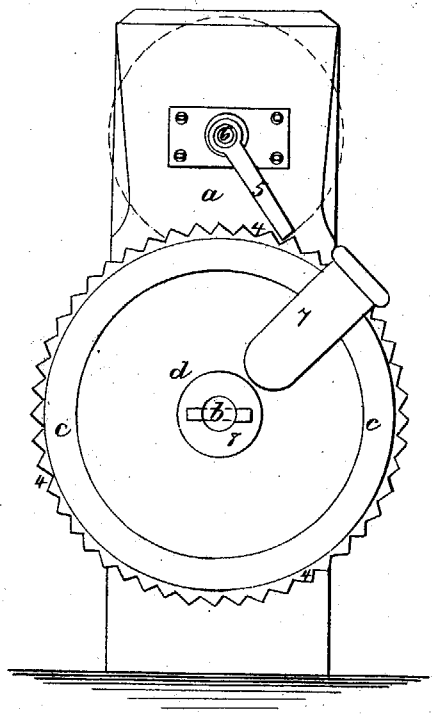
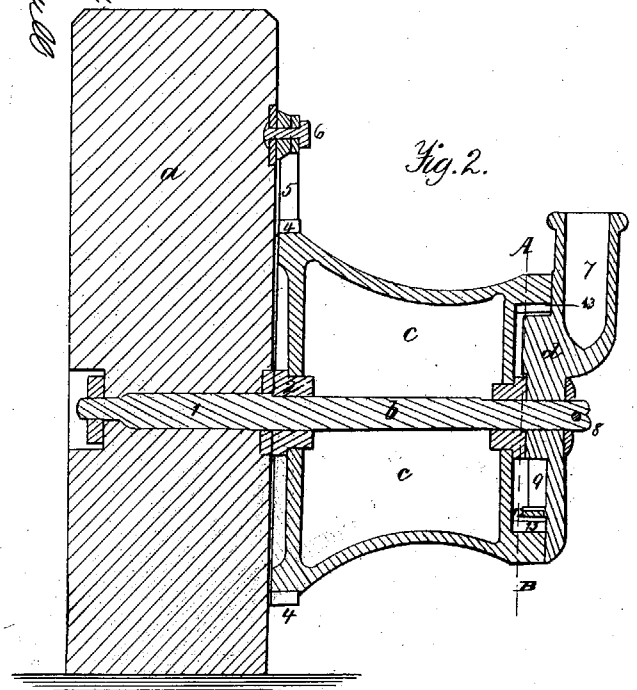
Witnesses.
Thos. Geo. Harold
Saml. H. Bull
Inventor:
Charles Perley
N. PETERS, PHOTO-LITHOGRAPHER, WASHINGTON, D. C.

UNITED STATES PATENT OFFICE.

CHARLES PERLEY, OF NEW YORK, N. Y.

IMPROVED DIRECT AND COUNTER-MOTION WINCH.

Specification forming part of Letters Patent No. 6,480, dated May 29, 1849; Reissue No. 1,188, dated May 21, 1861.

*To all whom it may concern:*

Be it known that I, CHARLES PERLEY, of the city and State of New York, machinist, have invented, made, and applied to use certain new and useful Improvements in Direct and Counter-motion Winches; and I do hereby declare that the said improvement and the mode of constructing and using the same are fully and substantially set forth and shown in the following description and in drawings annexed to and making part of this specification, wherein—

Figure 1 is a front elevation of my improved winch-head as in place for use. Fig. 2 is a vertical sectional elevation through the center of the winch, and Fig. 3 represents the winch-cap and pawls as seen from the interior at the lines A B of Fig. 2.

The nature of my said invention consists in the application of a disk and handspike-socket at the end of the winch-barrel, acting upon said barrel through the agency of ratchet-teeth and pawls in such a manner that the winch can be rotated by a handspike in either direction, thus dispensing with the ordinary movable crank in use before my invention, and enabling the winch to be placed closer down to the deck, and in situations where common cranks could not be effectively used.

Similar marks of reference apply to the same parts in each figure.

*b* is the shaft of the winch, having a round part on which the winch rotates, and a square stock-piece, 1, to fit into a bit or timber-head or stanchion, *a*, in any part of the ship, or the shaft may be a prolongation of the ship's windlass-shaft outside the head of the windlass, or the winch may be placed in any desired locality. 2 is a two-part journal-box on the inner end of the shaft, made to fit on the shaft, with the larger diameter against the bitt or other part to which the shaft is attached, and the smaller diameter fitted to a socket in the larger end of the winch-head *c*, with a Λ-key to make the box and head rotate together. 3 is a single journal-box on the shaft at the smallest end of the winch-head. By this construction of the boxes 2 and 3 a broken winch-head can be removed and a new one slipped on without removing the shaft, and the winch-head may either be fitted with whelps or not. At larger end of the winch barrel *c* is fitted with ratchet teeth 4 and a stop-pawl, 5, which may be bolted to whatever the winch itself is carried by, the ratchet-teeth 4 being made alike on each side at an angle of forty-five degrees with the radial line. The pawl is fitted on a pin, 6, to act on either side of its own center and take the ratchet-teeth in whatever direction the winch-head is worked.

On the outer or smaller end of the winch-head a ring flange, cast solid with the head, has on the inside edge a set of teeth, 13, forming a female ratchet-wheel, inclosed by a cap or movable cover, *d*. This has a boss or hub that sets against the outer journal-box, 3, and within the edge is an interrupted ring flange. Between one part of this and the boss a hollow block or plate forms a lodgment for the eyes and pins 11 11 of two pawls, 9 and 10, that are so set and hung as to take the teeth of the female ratchet 13, one pawl only operating in the direction of the rotation given, the other pawl hanging loose until the cap is moved with the socket on the opposite side and the stop-pawl 5 changed, when the winch can be turned the opposite way. A washer and pin, 8, on the outer point of the shaft *b*, secures all the parts in place, leaving them easily accessible for repair, if needed. The cap *d* is swelled out and extended so as to form a socket, 7, into which one end of a handspike or capstan-bar is to be inserted as a lever. On raising this in either direction one of the pawls 9 or 10 overruns the teeth 13, the other hanging clear of contact against a stop, 12, and on depressing the lever and socket 7 the point of the one pawl 9 or 10 takes the teeth 13 and partially rotates the winch by an intermittent but powerful motion, by which a rope or chain wound around may be hove taut for any required purpose, and when not in use the socket 7 hangs with the mouth downward, occupying but little more room than the winch-head and out of the way of accidental injury.

The shifting-crank ordinarily used with a winch on board ships is liable to injury by breakage, is frequently lost when wanted, often slips from the nose of the shaft when in use and causes accident to the crew, besides taking so much room in use that it must have a full sway all around both ways of the bitt or standard that carries the winch, so that the crank cannot be operated in many parts of the ship where a winch would save a dead haul in the arms of the crew.

By the improvement above set forth and shown all the inconveniences are avoided, the winch is always ready for use by a handspike, in any corner where there is room to place, and a mooring-rope to a wharf, a halyard, or sheet or tackle fall, taken from either direction of the winch, may easily and quickly be hove taut by a few men with this construction of winch and the heavy labor of a greater number relieved.

I do not claim to have invented a winch-head or any of the separate parts herein described and shown, irrespective of the manner in which I have applied and used them; but

What I claim as new, and desire to secure by Letters Patent, is—

1. The disk *d*, provided with a handspike-socket and fitted upon the shaft carrying the winch-head, and acting through the agency of pawls and ratchet-teeth to rotate the winch in either direction, as set forth.

2. The pawl 5, fitted to act on either side of its center 6—that is, on the stanchion or timber—and take the teeth when moving in either direction, as specified.

In witness whereof I have hereunto set my signature this 13th day of March, 1861.

CHARLES PERLEY.

Witnesses:
THOS. GEO. HAROLD,
JAS. H. BULL.